United States Patent Office 3,134,718
Patented May 26, 1964

3,134,718
PREGNA-1,4-DIENES AND COMPOSITIONS
CONTAINING SAME
Arthur Nobile, Roseland, N.J., assignor to Schering
Corporation, Bloomfield, N.J., a corporation of New
Jersey
No Drawing. Filed Dec. 12, 1963, Ser. No. 329,959
25 Claims. (Cl. 167—65)

This invention relates to an improved microbiological treatment of certain pregnenes whereby desirable chemical changes are effected without undesired degradation of the steroid molecule, such as splitting of the D-ring, or degradation of the side chain and to products produced thereby.

It is the general object of the invention to provide new compounds related to the cortical hormones and others having improved physiological activity.

It is also an object of the invention to effect chemical modification of certain pregnene compounds by a microbiological treatment thereof or by treatment with an enzymatic extract of the microbial culture whereby they are converted into 1,4-pregnadiene compounds with or without simultaneous oxidation of a secondary hydroxyl to a keto group.

More specifically, it is an object of the invention to accomplish one or more of the operations of oxidation, dehydrogenation and hydrolysis, and including the introduction of a second double bond into the A-ring of certain steroid compounds singly unsaturated in such ring, by subjecting them to the action of a culture of a member of the family of Corynebacteriaceae preferably of the genus Corynebacterium, and particularly of the species *Corynebacterium simplex* (American Type Culture Collection 6946) or *Corynebacterium hoagii* (A.T.C.C. 7005) or of an enzymatic extract of such cultures.

A number of chemical transformations of steroids by microorganisms have recently been developed which have involved the introduction of one or more hydroxyl groups into the steroid nucleus, or oxidation of hydroxyl groups to keto groups but without affecting the degree of saturation of the steroid nucleus. More recently there has been published the chemical transformation of progesterone by the use of microorganism, such conversions involving the introduction of a double bond in ring A, but with scission of carbon-to-carbon-linkages in the side chain as well as in ring D (Fried, Thoma and Klingsberg, "Oxidation of Steroids by Microorganisms. III. Side Chain Degradation, Ring D Cleavage and Dehydrogenation in Ring A," J.A.C.S. 75, 5764 (1953)). As described in this publication, fermentation of progesterone with *Streptomyces lavendulae* afforded 1,4-androstadien-3,17-dione, and also 1,4-androstadien-β-ol-3-one, known to be useful as intermediates in the synthesis of estradiol and estrone. This process thus involves the introduction of a Δ$^1$-double bond into progesterone, but with complete degradation of the side chain. With other microorganisms there are obtained not only elimination of the side chain, but also cleavage between carbon atoms 13 and 17. Thus, fermentation of progesterone with *Penicillium chrysogenum* gave the known testololactone, without introduction of a new double bond into ring A.

The above-named authors state further that "Biooxidation involving both lactone formation in ring D and dehydrogenation in ring A is less widespread and has been observed with but a small number of organisms." They refer to the fermentation of progesterone, Reichstein's Compound S or testosterone with *Cylindrocarpon radicicola*, and report that in each case they obtained Δ$^1$-dehydrotestololactone, i.e., the dehydrogenation was accompanied both by elimination of the side chain of the starting compound and by opening up of the D-ring.

It is accordingly a still further object of the present invention to provide a process for the introduction of a second double bond into the A-ring of steroid compounds already possessing a double bond in such ring (in the 4-position), without simultaneous degradation of the side chain and without splitting of the D-ring by fermenting them in a culture of a microorganism of the family Corynebacteriaceae, or by treating them with an enzymatic extract of such culture, whereby compounds of improved physiological activity, and also compounds capable of conversion by known means into physiologically active compounds, are obtained.

It is also an object of the invention to provide a simple and inexpensive process for effecting other chemical transformation in steroid compounds with the aid of the above-named microorganisms, both with and without the introduction of a double bond into ring A, all without splitting of the carbon skeleton of the original starting compound.

A preferred embodiment of the invention sought to be patented in one of its composition aspects resides in the concept of an anti-inflammatory steroid having a molecular structure represented by a Δ$^4$-pregnane having a keto group at the 3- and 20-positions, hydrogen at the 9α-position, hydroxy at the 17α- and 21-positions and being characterized by the presence of a double bond in the 1-position and a member of the group consisting of keto and β-hydroxy at the 11-position; to 21-pharmaceutically acceptable esters thereof; and to pharmaceutical formulations containing such compounds.

A further embodiment of the invention sought to be patented in another of its composition aspects resides in the concept of a Δ$^4$-pregnene having a keto group at the 3- and 20-positions, hydrogen at each of the 9α- and 17α-positions and a member of the group consisting of hydrogen, hydroxy and pharmaceutically acceptable esters thereof at the 21-position and being characterized by the presence of a double bond in the 1-position and a member of the group consisting of (H, H), O and (H, OH) at the 11-position.

Other objects and advantages of the invention will become apparent to those skilled in the art from the following more detailed description including the pharmaceutical formulations and manner of use.

I have found that the chemical modifications of 10,13-dimethyl steroids, and especially and most importantly the A-ring dehydrogenation of steroid compounds already singly unsaturated in the A-ring, with or without one or more of the operations of oxidation, reduction, and ester-hydrolysis, can be accomplished in an efficient and inexpensive manner by incubating or fermenting the starting steroid with a culture medium containing an organism of the family Corynebacteriaceae (or the enzymatic extract thereof), the nature of the chemical transformation or transformation depending upon the character of the starting compound.

In the preferred manner of carrying out the present invention there is accordingly employed a culture (or its enzymatic extract) of a dehydrogenating member of the family Corynebacteriaceae, which includes the genera Corynebacterium, Listeria, and Erysipelothrix. The last two of these genera include the species *monocytogenes*, *rhusiopathiae*, *murisepticus* and *erysipeloidia*, which are highly pathogenic bacteria, and their commercial use consequently introduces the problem of protecting the personnel against infection. While, therefore, the members of these two genera which act to dehydrogenate the A-ring of 10,13-dimethyl steroids can be employed in the process of this invention if proper precautions are taken, it is preferred to employ members of the genus Corynebacterium, as the latter includes many species which are non-pathogenic in character. Good results have been obtained with the species *Corynebacterium simplex* and *Corynebacterium hoagii*, the first of which is a soil bacterium, while the second is found in the human throat (where it apparently produces no pathologic condition) and sometimes as a contaminant of cultures exposed to the atmosphere, although its real or original habitat is not known. As best results have been obtained with *Corynebacterium simplex*, the invention will be further described mainly with particular reference to this organism, but it will be understood that other steroid-modifying, and particularly dehydrogenating members of the family Corynebacteriaceae can be employed in place of *Corynebacterium simplex*.

The starting steroid compounds can be of great variety, and I have not found any group of 10,13-dimethyl steroids which is not transformed chemically by the above named microorganism to produce a 1-dehydro compound. Thus, as disclosed more in detail hereinbelow, the culture is effective on various pregnenes, androstenes, including 17-methyl and 17-ethyl androstenes, and on sapogenins. The presence of a free hydroxyl group appears to promote the chemical transformations, but such transformations occur even though the hydroxyl group is itself oxidized to a keto group.

The starting compounds can have hydroxyl, keto, halogen, and ester groups in various positions of the nucleus or side chain; thus, hydroxyl groups may be present in the 3, 11, 17, 20 or 21-positions; keto groups may occupy the 3, 11, 17, 20 or 21-(aldehydo) positions, while halogen, such as fluorine or chlorine may be attached to the 9-carbon, or at other points of the nucleus or side chain. Ester groups, including and preferably the esters of acids usually employed in steroid synthesis and in preparing steroid hormones for therapeutic use, and particularly of the lower alkanoic acids, may be located at the 3, 11, 17, 20 or 21-positions. The hydroxyl groups at the 3, 11, and 17-positions can be either the α- or β-epimers.

By the process of the present invention, I have been able to convert 4-pregnene-17α,21-diol-3,11,20-trione into 1,4-pregnadiene-17α,21-diol-3,11,20-trione; 4 - pregnene-11β,17α,21-triol-3,20-dione into 1,4-pregnadiene-11β,17α,2-triol-3,20-dione; 4-pregnene-17α,21-diol-3,20-dione into 1,4-pregnadiene-17α,21-diol-3,20-dione; 5-pregnene-3β,20-diol into 1,4-pregnadiene-3,20-dione; 17-ethinyltestosterone into 17-ethinyl-1,4-androstadiene-17β-ol-3-one; 17-methyltestosterone into 17-methyl-1,4-androstadiene-17β-ol-3-one; 4-pregnene-11β,21-diol-3,20-dione into 1,4-pregnadiene-11β,21-diol-3,20-dione; 4-pregnene-21-ol-3,20-dione into 1,4-pregnadiene-21-ol-3,20-dione; and 4-pregnene-21-ol-3,11,20 trione into 1,4-pregnadiene-21-ol-3,11,20-trione. These transformations may be represented schematically as follows:

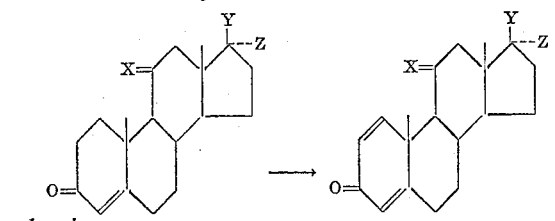

wherein
X=H₂, =O or (H, OH)
Y=—CO·CH₂OR (R=H or acyl)
Z= . . . CH or . . . H
Y=—OH
Z= . . . C≡ or . . . CH₃ or . . . H

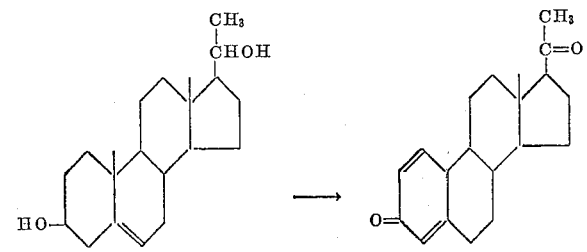

The products from these reactions possess the same pharmacodynamic properties as do the corresponding hormones, cortisone, hydrocortisone, progesterone, ethinyltestosterone, methyltestosterone, corticosterone, desoxycorticosterone and 11-dehydrocorticosterone (in all of which the Δ′-unsaturation is absent), but to a considerably enhanced degree, which makes them valuable agents in the treatment of the many diseases and conditions for which the parent hormones are employed.

By the process of the present invention, I have been able to convert for example, 4-pregnene-17α,21-diol-3,11,20-trione (cortisone or Compound E) into 1,4-pregnadiene-17α,21-diol-3,11,20-trione (1-dehydrocortisone or Δ′-dehydrocortisone) 4-pregnene - 11β,17α,21-triol-3,20-dione (hydrocortisone or Compound F) into 1,4-pregnadiene-11β,17α,21-triol-3,20-dione (Δ¹-dehydro-hydrocortisone or 1-dehydrohydrocortisone or 1-dehydrocortisol) and the corresponding 3-hydroxy and 3-ester compounds, i.e., 5-pregnene-3,17α,21-triol-11,20-dione and 5-pregnene-3,17α,21-triol-11,20-dione and 5-pregnene-3,11β,17α,21-tetrol-20-one and their 3-esters, into the corresponding 3-keto-1,4-pregnadiene end products. An ester group may be present not only in the 3-position but also in one or more of the 11, 17 and 21-positions. Where an ester group is present in the 3-position, it is hydrolyzed and the resulting hydroxyl group oxidized to a keto group in the course of the reaction. The ester groups in the 11- and 17-positions are generally not hydrolyzed, at least not to any significant extent; while an ester group in the 21-position may or may not be hydrolyzed, depending on the reaction conditions. Thus, where the starting compound is a 3,21-diester, the reaction product may be a 3-keto-21-ester compound, or a 3-keto-21-hydroxy compound. Along with 3-hydroxyl, also 20-hydroxyl will be oxidized to a keto group. It will thus be seen that the organism employed in the present invention is selective with respect to the oxidation step, this being limited practically completely to the 3- and 20-positions, while the hydrolysis may be restricted to 3-ester groups.

I have found that deacetylation at the 21-position occurs most readily at a pH of 6.8–7.1, and a temperature of about 26° to 29° C. Hydrolysis is greatly diminished below a pH of 6.5 and at a temperature above 32° C. On the other hand, the introduction of the Δ¹-double bond proceeds satisfactorily outside of the pH and temperature ranges at which deacetylation proceeds most actively; that is, the dehydrogenation occurs at a satisfactory rate at a pH of 7.6–8.0 at a temperature of 32° to 37° C. These conditions are therefore to be employed if hydrolysis of a 21-ester is to be minimized.

The process of the invention is applicable also to 9α-fluoro, 9α-bromo, and 9α-chloro derivatives of cortisone and hydrocortisone, yielding the corresponding pregnadienes. General transformation effected by my improved process as applied to corticoids may be represented schematically as follows:

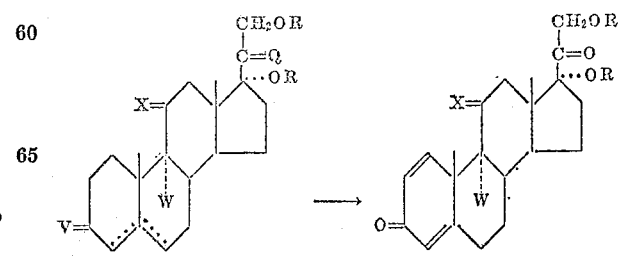

wherein

R is H or acyl, W is H, F, Cl, or Br;
X is =O or (H, OR); while V is =O or (H, OR); and
Q is =O or (H, OH);

the dotted line indicating the alternative position of the double bond.
Specific reactions effected by the process of the invention are illustrated by the following:
(1) 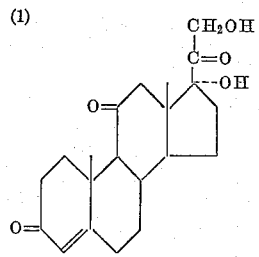
(2) 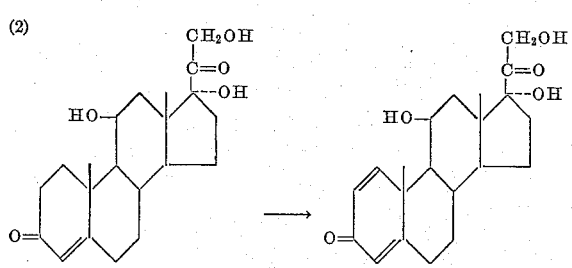
other specific reactions effected by the process of the invention are illustrated by the following:
(3) 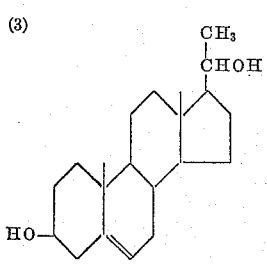
(4) 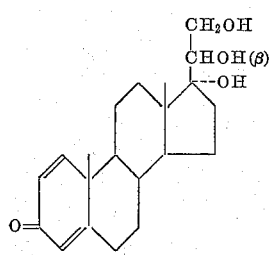
altered medium
(5) 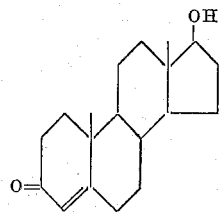 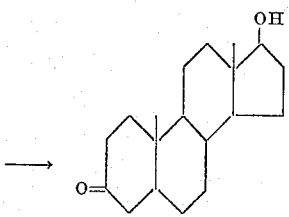
(6) 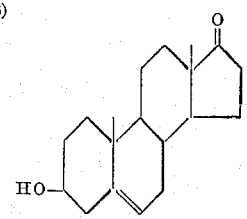
(7) 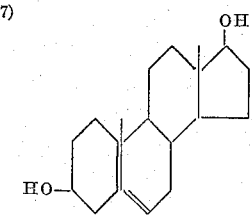 → same as (5)
(8) 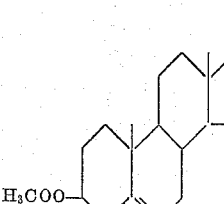 → same as (5)
(α and β)
(9) 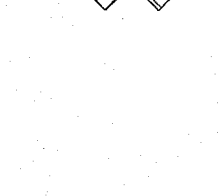 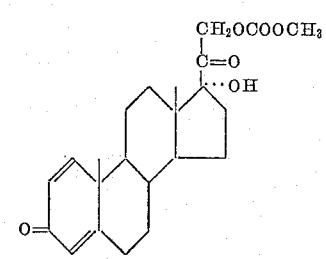

TABLE I.—OBSERVED TRANSFORMATIONS

| Starting Material | | Products |
|---|---|---|
| Technical Name | Common Name | |
| 5-Androstene-3β-ol-17-one | Dehydroepi-androsterone. | 4-Androstene-3,17-dione. |
| 4-Androstene-17β-ol-3-one | Testosterone | (1,4-Androstadiene-3,17-dione), (1,4-Androstadiene-17β-ol-3-one). |
| 5-Pregnene-3β,20-diol | | 1,4-Pregnadiene-3,20-dione. |
| 4-Pregnene-17α,21-diol-3,20-dione. | Reichstein's Compound S. | 1,4-Pregnadiene-17α,21-diol-3,20-dione and 1,4-Pregnadiene-17α,20β,21-triol-3-one. |
| 5-Androstene-3β,17β-diol | | (1,4-Androstadiene-3,17-dione), (1,4-Androstadiene-17β-ol-3-one.) |
| 17-Methyl-4-androstene-17β-ol-3-one. | Methyl testosterone. | 17-Methyl-1,4-androstadiene-17β-ol-3-one. |
| 17-Ethinyl-4-androstene-17β-ol-3-one. | Ethinyl-testosterone. | 17-Ethinyl-1,4-androstadiene-17β-ol-3-one. |
| 4-Pregnene-21-ol-3,20-dione. | Desoxycorti-costerone. | 1,4-Pregnadiene-21-ol-3,20-dione. |
| 9α-Fluoro-4-pregnene-11β,17α,21-triol-3,20-dione. | Fluoro Compound F. | 9α-Fluoro-1,4-pregnadiene-11β,17α,21-triol-3,20-dione. |
| 4-Pregnene-11β,21-diol-3,20-dione. | Corticosterone | 1,4-Pregnadiene-11β,21-diol-3,20-dione. |
| 4-Pregnene-21-ol-3,11-20-trione. | Kendall's Compound A. | 1,4-Pregnadiene-21-ol-3,11,20-trione. |
| 5-Pregnene-3β,17α,21-triol-20-one 3,21-diacetate. | | (1,4-Pregnadiene-17α,21-diol-3,20-dione), (4-Pregnene-17α,21-diol-3,20-dione-21-acetate). |
| 4-Pregnene-20-ol-3-one | | 1,4-Pregnaiene-3,20-dione. |
| 4-Pregnene-11β,17α,21-triol-3,20-dione. | hydrocortisone | 1,4-Pregnadiene-11β,17α,21-triol-3,20-dione. |
| 4-Pregnene-17α,21-diol-3,11,20-trione. | cortisone | 1,4-Pregnadiene-17α,21-diol-3,11,20-trione. |

The importance of my invention is many-fold. It is now possible to prepare easily and directly previously unknown, as well as known, steroid hormone substances containing an additional Δ¹-unsaturation. The heretofore unknown compounds include the Δ¹-derivatives of cortisone, hydrocortisone, corticosterone, Kendall's Compound A, testosterone, methyl- and ethinyl-testosterone, and progesterone, to name a few.

As indicated heretofore, the potency and therapeutic applicability of a Δ⁴-mono unsaturated steroid hormone, especially the corticoids, are considerably enhanced by the addition of a Δ¹-bond and in particular in those compounds exhibiting anti-inflammatory effects. For example, in the widely accepted eosinophile test (Rosenberg, E., et al., Endocrinology 54, 363 (1954)), for cortical hormone activity, the dienes corresponding to cortisone and hydrocortisone are several times as potent as the corresponding natural hormones.

Furthermore, it is now possible to convert 5-androstene-3β,20-diol directly and in one step to 1,4-androstadiene-17β-ol-3-one and 1,4-androstadiene-3,17-dione, which are valuable intermediates in the preparation of estradiol and estrone. The process of the present invention provides a much more efficient way of preparing these intermediates, and others than has been described heretofore.

In clinical testing, the diene derivative of hydrocortisone has been found to be considerably more effective in a daily dose of 30 to 50 mg. than 75 to 100 mg. of cortisone acetate or of hydrocortisone. Whereas a patient standardized on a 75 to 100 mg. dosage of cortisone acetate, or of hydrocortisone, would require 90 to 110 mg. of codeine per day to be relieved to pain when the dosage of the cortisone acetate or hydrocortisone was reduced to 50 mg. per day, this dosage (50 mg.) of the diene derivative of hydrocortisone required no supplemental treatment with codeine and has given complete relief from pain. In fact, a daily oral dose of 50 mg. of the diene derivative of hydrocortisone had even more favorable results than a daily oral dose of 75 to 100 mg. of cortisone acetate or of hydrocortisone as it gave greater relief from pain, as evidenced by the ability of the arthritic patient to clench the fist, walk briskly, and engage in other muscular activity without pain.

Dramatic and immediate improvement has been reported in a group of patients who had suffered from rheumatoid arthritis for periods ranging from 2½ to 25 years on treatment with 1-dehydrocortisone, the improvement being both subjective and objective. Some of these patients had received no steroid therapy, while others had received, besides aspirin, also cortisone, hydrocortisone, corticotropin, gold compounds, phenylbutazone, or terramycin, but in each case the results had been unsatisfactory. The appearance of objectionable side effects had discouraged increase in the dose of cortisone. 1-dehydrocortisone had been administered orally every 8 hours, three times daily. The initial dosage ranged from 30 to 60 mg., while the maintenance doses ranged from 5 to 25 mg. daily, no other drug being administered during the course of treatment. In all cases, easing of joint pain and diminution of stiffness accompanied by a distinct feeling of well being was noted by the patients within 4 to 6 hours after the first dose of 10 mg. was taken. In most patients, increased temperature and redness of periarticular tissues disappeared at the end of 24 hours. Swelling, tenderness and pain on motion were markedly reduced and the range of motion increased in some patients at the end of only 24 hours, and the improvement progressed as the treatment continued.

The anti-inflammatory properties of particular steroid compounds of the instant invention, especially 3,20-diketo-17α,21-dihydroxy-4-pregnenes (or 21-esters thereof) having an 11-keto or 11β hydroxy group and characterized by an additional double bond in the 1-position have been found to be of great value therapeutically. These may be administered in sufficient amount to cause complete suppression of rheumatoid arthritis with marked absence or diminution of side effects such as retention of sodium, loss of potassium or nitrogen, and gain in body weight.

Maintenance doses of 5 to 25 mg. of 1-dehydrocortisone and 1-dehydro-hydrocortisone, as determined by clinical response, are at least equal in their objective and subjective effects to from 50 to 112.5 mg. of cortisone. These relatively small maintenance doses of 1-dehydrocortisone have produced prompt improvement in patients who had failed to respond to larger doses of cortisone and hydrocortisone. The side effects with my new preparation are also much less severe and less common than have been observed in cortisone therapy, indicating a higher therapeutic ratio than that of cortisone.

In order to obtain a desirable growth of *Corynebacterium simplex* (American Type Culture Collection 6946) for the process of this invention, a suitable nutrient medium is prepared containing carbohydrate, organic nitrogen, cofactors, and inorganic salts. It is possible to omit the use of carbohydrate without completely impairing the growth of the organism. The steroid compound as a solid or dissolved or suspended in ethanol, acetone or any other water-miscible solvent which is non-toxic toward the organisms, is added to the cultivated microorganism in a broth medium under sterile conditions. This culture is then shaken, aerated, or simultaneously aerated and agitated, in order to enhance the growth of the *Corynebacterium simplex* and the biochemical conversion of the steroid substrate. The steroid may be added to the broth medium and then inoculated with the bacterium, or the cultivated microorganism in broth medium may be added to the steroid. In certain cases, depending on the conditions of the reaction medium, it may be more desirable to obtain optimum growth of the microorganism before the addition of the steroid. Alternatively, enzyme preparations obtained in known manner from cultures of *Corynebacterium simplex* may be used for carrying out the process.

A useful method for carrying out the process is the cultivation of *Corynebacterium simplex* on a suitable nutrient medium under aerobic conditions. After cultivation of the microorganism, the cell mass may be harvested by centrifuging the nutrient broth, decanting the supernatant liquid and suspending the cell mass in saline. A suitable volume of the cell suspension is then seeded into a desirable nutrient medium for supporting growth of the microorganism. The nutrient medium employed may be a yeast extract (Difco) casein hydrolysate (N-Z-Amine) (Type B Sheffield), corn steep liquor, water extract of soybean oil meal, lactalbumin hydrolysate (Edamine-Sheffield Enzymatic), fish solubles, and the like.

Inorganic salts are desirable to maintain a pH level in the reaction medium of between 6.8 and 7.2. However, the use of inorganic salts for buffering the reaction mixture may be omitted. The omission of inorganic salts causes the pH to rise from an initial value of 6.8 to about 7.7-$\beta$. This, however, will still permit the formation of the desired steroidal and products. The optimum temperature for growth of the selected microorganism is 37° C., but the temperatures may vary between 25° and 37°, and even between 20° and 40° C. The time of reaction may vary from as little as 3 hours to as much as 48 hours. The length of time which is employed will depend on the steroid which is being transformed. Any water miscible, non-toxic (to the organism) solvent may be employed to dissolve or suspend the steroid. I prefer to use ethanol or acetone in such amounts that the final concentration of these solvents in the reaction mixture is no higher than about 7% and may amount to only traces; owing to evaporation, the final concetration of the organic solvent may even be practically zero.

Following the completion of the oxidation or dehydrogenation process, which may be accompanied by partial or complete hydrolysis when mono- or poly-esters are used, the products of reaction may be recovered from the mixture by extraction with a suitable water-immiscible solvent, by filtration, by adsorption on a suitable adsorbent, or by any of the other procedures commonly used in the art. For extraction, chlorinated lower hydrocarbons, ketones, and alcohols are useful. These include chloroform, methylene chloride, trichloroethane, ethylene dichloride, butanol, diethylketone, and others. I prefer to use extraction as the method for isolating the steroidal products. Following extraction, the products may be isolated by concentration of the extracts to a small volume or to dryness. Purification of the residues may be then accomplished in several ways. In many instances, as with the diones of cortisone and hydrocortisone, simple re-crystallizations from a suitable solvent or solvent mixture, such as acetone, methylene chloride, ethanol, acetone-hexane, methylene chloride-hexane, etc. affords the desired dienone in excellent yield and high state of purity. Where there are several products formed in the same reaction, a separation is conveniently achieved by chromatography on silica gel, magnesium silicate (Florisil), alumina or other commonly employed adsorbents. It should be understood that where a mixture of more polar steroids is to be separated, more polar eluents will be required in chromatographic separation. Furthermore, the activity of the adsorbent varies from batch to batch and consequently the same steroids may be more strongly or more weakly hold in parallel experiments which will result in variation of the value of the concentration of the eluents which will elute a given steroid. In any case, the order of elution will remain the same for a given adsorbent and a given solvent system.

The 1,4-diene structure of the products has been established in various ways. The steroids described herein are new substances and careful attention has been paid to the proof of their structures. Infrared analyses, ultra-violet analyses, rotational analyses, degradative studies, and carbon-hydrogen analyses have been employed where necessary to establish the nature of the products. The introduction of the $\Delta^1$ unsaturation in a 3-keto-$\Delta^4$-steroid is known to have a characteristic negative effect on the molecular rotation of the product, and I have observed this shift in rotation in the dienones which I have prepared from cortisone and hydrocortisone among others.

The chemical transformations which can be accomplished by subjecting the various 10,13-dimethyl steroids to the action of a culture of *Corynebacterium simplex* (the term "culture of *Corynebacterium simplex*" is to be understood in this specification and in the claims as including the enzymatic extract of such culture) are thus of widely different kinds, and can take place singly, or two or more of such transformations can occur simultaneously or in sequence. The various reactions appear to be unaffected by other substituents in the steroid nucleus or in the side chain.

The reactions of the present invention include the conversion of 5-pregnene-3,17$\alpha$,20,21-tetrol-11-one and its 3- and/or 21-esters into 1,4-pregnadiene-17$\alpha$,21-diol-3,11,20-trione and its 21-ester; and of 5-pregnene-3,11$\alpha$,17$\alpha$,20,21-pentol and its 3- and/or 21-esters into 1,4-pregnediene-11$\alpha$,17$\alpha$,21-triol-3,20-dione and its 21-ester.

While the lower alkanoic esters are generally preferred, and particularly the acetates, as above indicated, it will be understood that the specific character of the ester is not controlling in my process and that other esters, both of organic and inorganic acids may be employed, such as cyclopentyl and cyclohexyl acetates, propionates and butyrates, and also the phosphates, polyphosphates and sulfates, it being necessary only that the esters be non-toxic toward the microorganism. The hydroxylated products, especially the 21-hydroxylated anti-inflammatory dienes can, if desired, be converted into their coresponding 21-esters, by known procedures, such as later described herein.

The therapeutically active dienes of the present invention are preferably administered by mouth in the form of tablets containing, for example, about 5 to 20 mg. per tablet mixed with a solid carrier containing one or more of the usual ingredients, such as starch, sugar, gums, scaps, clays and the like. They may, however, be also administered by subcutaneous or intramuscular injection, dissolved, or suspended in a suitable non-toxic liquid vehicle; or they can be administered in the solid form by subcutaneous implantation, or in the form of suppositories dissolved or suspended in a fatty or waxy vehicle which melts at approximately body temperature. They can also be adminsitered topically in the form of an ointment or cream in which they are dissolved or suspended in an unguent or cream base of known composition; and they may also be employed in the form of ointments and aqueous suspensions for ophthalmic use. The compounds in microcrystalline form in aqueous suspensions can be used for intra-articular injection and also as nasal spray; while infusions can be prepared for intravenous use.

The fish solubles referred to hereinabove are presently available commercially as an extract of herring, menhaden, and various mixtures thereof, which has been subjected to an enzymatic hydrolysis. This material can be added directly to the culture broth for supplying nutrient material. Where fish solubles (50% solid content) are available which have not been subjected ot enzymatic hydrolysis, such extracts should be diluted with water and steamed for about 10 minutes to 90° C. followed by filtration, preferably with the aid of diatomaceous earth.

This application is a continuation in-part of my co-pending applications, Serial No. 449,257, filed August 11, 1954; and Serial No. 492,773 filed March 7, 1955, both now abandoned.

The invention will be described in further detail in the following examples which are presented by way of illustration only and not as indicating the scope of the invention.

EXAMPLE 1

*Conversion of Cortisone to 1,4-Pregnadiene-17α,21-Diol-3,11,20-Trione*

From a solution of 30 g. of yeast extract (Difco) in 3.0 l. of tap water containing 13.2 g. of potassium dihydrogen phosphate and 26.4 g. of disodium hydrogen phosphate (pH of the solution 6.9), 27 portions of 100 ml. each are withdrawn, placed in 300 ml. Erlenmeyer flasks and sterilized by autoclaving for 15 minutes at 15 lb. steam pressure (120° C.). After autoclaving and cooling of the broth one ml. of a suspension of *Corynebacterium simplex* (A.T.C.C. 6946) is placed in each flask. The flasks are then shaken on a shake table at 220 r.p.m. and 28° C. for 24 hours.

Into each of 27 Erlenmeyer flasks are placed 150 mg. of cortisone. The flasks and contents are then sterilized for 15 minutes at 15 lb. steam pressure (120° C.). To each flask are then added 5.0 ml. of ethanol. The 24-hour bacterial culture is then transferred aseptically and the resulting suspensions are shaken on a shake table at 220 r.p.m., and 28° C. for 48 hours. The final pH is 7.2.

The contents of all the flasks are combined and extracted with a total of 9.0 l. of chloroform in three equal portions. The combined extracts are then concentrated to a residue which is crystallized from acetone-hexane. There results 1.1 g. of 1,4-pregnadiene-17α,21-diol-3,11,20-trione, M.P. 210–215° C. (dec.). Several additional recrystallizations raised the M.P. to 230–232° C. (dec.); $[\alpha]_D^{25}$ +175.3 (dioxane); $\epsilon_{238}$ 15,400 (methanol).

*Analysis.*—Calcd. for $C_{21}H_{26}O_5$: C, 70.37; H, 7.31. Found: C, 70.38; H, 7.67.

The infrared spectrum of the product shows the presence of a 1,4-diene-3-one system, hydroxyl and additional carbonyl (6-membered ring or side-chain). The structure of the product is established as 1,4-pregnadiene-17α,21-diol-3,11,20-trione by degradation to 1,4-androstadiene-3,11,17-trione (identical with an authentic sample) and by formation of a monoacetate by the action of acetic anhydride-pyridine which shows a characteristic interaction of the C-20 carbonyl with the C-21 acetate in the infrared spectrum.

*21-Acetylation of 1,4-Pregnadiene-17α,21-Diol-3,11,20-Trione*

To a solution of 0.5 g. of 1,4-pregnadiene-17α,21-diol-3,11,20-trione in 5 ml. of anhydrous pyridine are added 3 ml. of acetic anhydride. The reaction mixture is permitted to stand overnight at room temperature, and is then diluted with ice and water. The resulting precipitate is filtered and recrystallized from acetone-hexane. There is obtained 0.35 g. of 1,4-pregnadiene-17α,21-diol-3,11,20-trione 21-acetate, M.P. 227–228° C. (dec.). After several recrystallizations from acetone-hexane it melted at 233–236° C. (dec.).

EXAMPLE 2

*Conversion of Hydrocortisone to 1,4-Pregnadiene-11β,17α,21-Triol-3,20-Dione*

From a solution of 3 g. of yeast extract (Difco) in 3.0 l. of tap water containing 13.2 g. of potassium dihydrogen phosphate and 26.4 g. of disodium hydrogen phosphate (pH of the solution, 6.9) 27 portions of 100 ml. each are withdrawn, placed in 300 ml. Erlenmeyer flasks and sterilized by autoclaving for 15 minutes at 15 lb. steam pressure (120° C.). After autoclaving and cooling of the broth, one ml. of suspension of *Corynebacterium simplex* (A.T.C.C. 6946) is placed in each flask. The flasks are then shaken on a shake table at 220 r.p.m. and 28° C. for 24 hours.

Into each of 27 Erlenmeyer flasks are placed 150 mg. of hydrocortisone. The flasks and contents are then sterilized for 15 minutes at 15 lb. steam pressure (120° C.). To each flasks are then added 5.0 ml. of ethanol. The 24-hour bacterial culture is then transferred aseptically and the resulting suspensions are shaken on a shake table at 220 r.p.m. and 28° C. for 48 hours. The pH at the end of the shake period is 7.0.

The contents of all the flasks are combined and extracted with a total of 9.0 l. of chloroform in three equal portions. The combined extracts are then concentrated to a residue which weigh 3.75 g. The M.P. of the residue is 227–232° C. From 2.75 g. of this crude material on sludging with 50 ml. of acetone and cooling, there is recovered in filtration 1.35 g. of 1,4-pregnadiene-11β,17α,21-triol-3,20-dione, M.P. 237–239° C. (dec.). Additional product can be recovered from the mother liquor. Recrystallization from acetone raised the M.P. to 239–241° C. (dec.); $[\alpha]_D^{25}$ +107° (dioxane): $\epsilon_{243}$=14,600 (methanol).

*Analysis.*—Calcd. for $C_{21}H_{28}O_5$: C, 69.97; H, 7.83. Found: C, 70.24; H, 8.13.

The infrared spectrum indicates the presence of a 1,4-diene-3-one system, hydroxyl and a 6-membered ring or side chain ketone (in addition to the dienone carbonyl). From this evidence and the fact that a mono-acetate is formed with acetic anhydride-pyridine whose infrared spectrum shows the expected interaction between the C-21 acetate and the C-20 carbonyl group, the product of fermentation is proven to possess the assigned structure.

*21-Acetylation of 1,4-Pregnadiene-11β,17α,21-Triol-3,20-Dione*

To a solution of 0.85 g. of 1,4-pregnadiene-11β,17α,21-triol-3,20-dione in 5 ml. of pyridine are added 3 ml. of acetic anhydride. The reaction mixture is allowed to stand at room temperature overnight and is then diluted with ice water. The resulting precipitate is filtered from the mixture and recrystallized from acetone-hexane. There is recovered 0.45 g. of 1,4-pregnadiene-11β,17α,21-triol-3,20-dione 21-acetate, M.P. 235–239° C. On recrystallization, the M.P. rose to 237–239°; $[\alpha]_D^{25}$ +116° (dioxane): $\epsilon_{243}$ 15,000 (methanol).

*Analysis.*—Calcd. for $C_{23}H_{30}O_6$: C, 68.63; H, 7.51. Found: C, 68.62; H, 7.78.

EXAMPLE 3

*Conversion of Hydrocortisone 21-Acetate to the 1,4-Diene and its 21-Acetate*

The reaction is run exactly as described for the transformation of hydrocortisone to the corresponding diene (Example 2), and the product is isolated by chloroform extraction and crystallization from acetone. From 1.0 g. of hydrocortisone 21-acetate there is obtained 0.22 g. of 1,4 - pregnadiene-11β,17α,21-triol-3,20-dione, M.P. 239–241° C. (dec.).

When it is desired to suppress the deacetylation reaction, the same conditions as above are used with the exception that the temperature of the environment for the growth and reaction phases of the process is raised to 36° C. The product is isolated in the usual way. From 1.0 g. of hydrocortisone 21-acetate there results 0.13 g. of hydrocortisone diene-21-acetate, M.P. 237–239° C. (dec.).

EXAMPLE 4

*Conversion of Cortisone 21-Acetate to the 1,4-Diene and its 21-Acetate*

The reaction is conducted as described for the transformation of cortisone to the corresponding diene (Example 1), and the product is isolated by chloroform extraction and crystallized from acetone-hexane. From 1.0 g. of cortisone acetate there is isolated 0.17 g. of 1,4-pregnadiene - 17α,21 - diol - 3,11,20 - trione, M.P. 230–232° C.

When it is desired to suppress the deacetylation, the same conditions as above are used with the exception that the temperature of the environment for the growth and reaction phases of the process is raised to 36° C. The product is isolated in the usual way. From 1.0 g. of cortisone acetate there results 0.11 g. of cortisone diene-21-acetate, M.P. 230–233° C. (dec.).

EXAMPLE 5

*Conversion of Compound S to 1,4-Pregnadiene-17α,21-Diol-3,20-Dione, and 1,4-Pregnadiene-17α,20,21-Triol-3-One*

One hundred ml. of a 1.0% yeast extract concentrate including 9.0 ml. of 0.2 M $KH_2PO_4$ and 9.0 ml. of 0.2 M $Na_2HPO_4$ is sterilized as before and inoculated with a 1.0% suspension of *Corynebacterium simplex* (A.T.C.C. 6946) from a 24-hour broth culture. The newly seeded culture is incubated and shaken (shake table) for 20 hours at 28° C. After incubation the broth culture is transferred aseptically to a second sterile 300 ml. Erlenmeyer flask containing 150.0 mg. of sterile Compound S (4-pregnen-17α,21-diol-3,20-dione) in 5.0 ml. ethanol or acetone. The pH of the reaction mixture is 7.0. The bacterial culture containing steroid and solvent is incubated and shaken for a period of 48 hours at 28° C. The final pH of the reaction mixture is 7.2–7.4. The culture is then extracted thoroughly with chloroform. The extracts are pooled and concentrated on a steam bath to dryness. The crude extract weighs 196.0 mg.

The total crude extract is sludged with methanol and there is obtained 80 mg. of crystalline solid, M.P. 246–250° C. After two crystallizations from acetone the M.P. is 246–249° C. (dec.), $[\alpha]_D^{25}$ +76° ($CHCl_3$), $E_{245}$ 15,500 ($C_2H_5OH$).

Calc'd for $C_{21}H_{28}O_4$: C, 73.22; H, 8.19. Found: C, 73.56; H, 8.40.

The infrared spectrum indicates the presence of the 1,4-diene-3-one system, hydroxyl and another carbonyl (6-membered ring or side-chain). The product is therefore 1,4-pregnadiene-17α,21-diol-3,20-dione.

The structure is proved by degradation with sodium bismuthate in aqueous acetic acid to 1,4-androstadiene-3,17-dione and by acetylation to a 21-monoacetate (interaction between 21-acetate and 20-carbonyl apparent in the infrared spectrum).

*21-Acetylation of 1,4-Pregnadiene-17α,21-Diol-3,20-Dione*

To a solution of 0.25 g. of 1,4-pregnadiene-17α,21-diol-3,20-dione in 2 ml. of pyridine was added 1 ml. of acetic anhydride. The reaction mixture was allowed to stand at room temperature overnight and was then diluted with ice and water. The resulting precipitate was filtered and recrystallized from methylene chloride-hexane, affording 0.20 g. of 1,4-pregnadiene-17α,21-diol-3,20-dione 21-acetate, M.P. 226.5–228° C.

EXAMPLE 6

*Conversion of Compound S to 1,4-Pregnadiene-17,21-Diol-3,20-Dione, and 1,4-Pregnadiene-17α,20,21-Triol-3-One*

One hundred ml. of a medium consisting of 1% fish solubles (prepared as described below), 0.1% yeast extract, 9.0 ml. of 0.2 M $KH_2PO_4$ and 9.0 ml. of 0.2 M $Na_2HPO_4$ are sterilized as described hereinabove and inoculated with a suspension of *Corynebacterium simplex* from a 24-hour broth culture. The newly seeded culture is incubated and shaken (shake table) for 20 hours at 28° C. After incubation, the broth culture is transferred aseptically to a second sterile 300 ml. Erlenmeyer flask containing 150 mg. of sterile Compound S in 5.0 ml. of ethanol. The pH of the reaction mixture is 6.9. The bacterial culture containing steriod and solvent is incubated and shaken for 48 hours at 28° C. The final pH is 7.3. The culture is extracted with 2 l. of chloroform in 5 equal portions, the extracts are pooled, and the pool is concentrated on the steam bath.

The crude residue is taken up in methylene chloride and chromatographed over Florisil. There is isolated from the chromatogram, starting material (15 mg.), 1,4-pregnadiene-17α,21-diol-3,20-dione (30 mg.) and 1,4-pregnadiene-17α,20,21-triol-3-one (90 mg.). The previously unidentified triol is recrystallized from acetone-hexane and melts at 195–190° C., $[\alpha]_D^{25}$+33° (methanol).

*Analysis.*—Calcd. for $C_{21}H_{30}O_4$: C, 72.80; H, 8.73. Found: C, 72.79; H, 9.08.

The structure of the triol is proved by acetylation with acetic anhydride-pyridine to a 20,21-diacetate and degradation to 1,4-androstadiene-3,17-dione. The infrared spectrum of the triol shows a 1,4-diene-3-one band, strong hydroxyl band and the absence of anything corresponding to a 20-carbonyl band.

In place of ethanol there can be employed other water-soluble organic solvents which are non-toxic to the microorganism, such as acetone, mixtures of ethanol and acetone, and the like.

EXAMPLE 7

*Conversion of Hydrocortisone to 1,4-Pregnadiene-11β,17α,21-Triol-3,20-Dione*

From a solution of 1 gram yeast extract (Difco) in 1.0 liter of tap water containing 4.4 gm. of potassium dihydrogen phosphate and 8.8 g. of disodium hydrogen phosphate (pH of the solution 6.9), 10 portions of 100 ml. each are withdrawn, placed in 300 ml. Erlenmeyer flasks and sterilized by autoclaving for 15 minutes at 15 lbs. steam pressure (120° C.). After autoclaving and cooling of the broth, one ml. of suspension of *Corynebacterium hoagii* (American Type Culture Collection 7005) is placed in each flask. The flasks are then shaken on a shake table at 220 r.p.m. and 28° C. for 16½ hours.

Into each of the 10 Erlenmeyer flasks, 50 mg. of hydrocortisone dissolved in 1 ml. of 90% methanol is added aseptically. The flasks are replaced on the shaker and incubated for 7 hours. The pH at the end of the shake period is 6.82.

The contents of all flasks are combined and extracted with a total of 3 liters of chloroform in 3 equal portions. The combined extracts are concentrated to a residue of 425 mg. Crystallization of the residue from acetone affords 248 mg. of 1,4-pregnadiene-11β,17α,21-triol-3,20-dione.

EXAMPLE 8

*Conversion of Hydrocortisone to 1,4-Pregnadiene-11β,17α,21-Triol-3,20-Dione*

From a solution of 0.5 gram Basamin Busch (Anheuser-Busch) in 1 liter of tap water, 10 portions of 100 ml. each are withdrawn, placed in 300 ml. Erlenmeyer flasks and sterilized by autoclaving for 15 minutes at 15 lb. steam pressure (120° C.). After autoclaving and cooling of the broth, one ml. of a suspension of *Corynebacterium simplex* is placed in each flask. The flasks are then shaken on a shake table at 220 r.p.m. and at 28° C. for 24 hours.

Into each of the 10 Erlenmeyer flasks 50 mg. of hydrocortisone dissolved in 0.8 ml. of absolute methanol, are added aseptically. The flasks are replaced on the shaker and incubated for an additional 4–7 hours. The pH at the end of the shake period is 7.2–7.6.

The contents of all flasks are combined and extracted with a total of 3 liters of chloroform in 3 equal portions. The combined extracts are concentrated to a residue of 490 mg. Crystallization of the residue from acetone affords 403 mg. of 1,4-pregnadiene-11β,17α,21-triol-3,20-dione, M.P. 238–240° C. (dec.): $[\alpha]_D^{25}$ +105° (dioxane), $\epsilon_{243}$ 14,500 (methanol).

EXAMPLE 9

*Conversion of Cortisone to 1,4-Pregnadiene-17α,21-Diol-Diol-3,11,20-Trione*

The procedure described in Example 8 is followed except that cortisone is used in place of hydrocortisone, while the conversion time is increased to 6–12 hrs. The crude diene is obtained in a yield of 85%.

Examples 8 and 9 show that the yield is increased with reduction in the concentration of the starting compound.

EXAMPLE 10

*Conversion of 9α-Fluoro-4-Pregnene-11β,17α,21-Triol-3,20-Dione to the 1,4-Pregnadiene*

A one hundred ml. broth culture containing a 0.1% acid extract concentration, 9.0 ml. of 0.2 M $KH_2PO_4$ and 9.0 ml. of 0.2 M $Na_2HPO_4$ contained in a 300 ml. Erlenmeyer flask is seeded with 1 ml. of a 24-hour broth culture of *Corynebacterium simplex*. The flask is incubated at 28° C. for 24 hours. A second 300 ml. Erlenmeyer flask containing 100 mg. of sterile 9α-fluoro-4-pregnene-11β,17α,21-triol-3,20-dione in 5.0 ml. of acetone is incubated with the 24-hour culture of the bacterium. The culture containing steroid solution is incubated for 48 hours at 28°–30° C.

The culture is then extracted with three volumes of chloroform, the extracts combined and concentrated to dryness on a steam bath. Recrystallization of the residue gives 9α - fluoro - 1,4-pregnadiene-11β,17α-21-triol-3,20-dione as a crystalline solid (from acetone), M.P. 247–250° C.

EXAMPLE 11

*Reaction of 5-Pregnen-3β,20-Diol*

One hundred ml. of a 0.1% yeast extract concentrate including 9.0 ml. of 0.2 M $KH_2PO_4$ and 9.0 ml. of 0.2 M $Na_2HPO_4$ is autoclaved in a 300 ml. Erlenmeyer flask. After autoclaving for 15 minutes at 15 lbs. (120° C.), the flask is allowed to cool to room temperature. The flask is then seeded with a suspension of *Corynebacterium simplex* (A.T.C.C. 6946). The seeded flask is incubated and shaken (shake table) for 24 hours at 28° C.

A second 300 ml. Erlenmeyer flask containing 150 mg. of 5-pregnene-3β,20-diol is sterilized in an autoclave for 15 minutes at 15 lbs. (120° C.). To this flask is then added 5.0 ml. of acetone or ethanol to dissolve the steroid. The 24-hour growth culture of *Corynebacterium simplex* is transferred asptically to the flask containing the steroid and the reaction mixture is shaken (shake table) for 36 hours at 28° C. At the end of the transformation period the pH is 7.1–7.2.

The reaction mixture is then extracted thoroughly with chloroform, the chloroform extracts are pooled and the resulting solution is concentrated to a residue (0.20 g.). The crude extract is crystallized from ether as long prisms, M.P. 135–138° C. Two crystallizations from methylene chloride-hexane afford 0.06 g. of 1,4-pregnadiene-3,20-dione, M.P. 152–153° C., $[\alpha]_D^{25}$ +122° C. ($CHCl_3$), $\epsilon_{245}$ 15,000 ($C_2H_5OH$). The infrared spectrum indicated the presence of a 1,4-diene-3-one system, another carbonyl (6-membered ring or side-chain), and the complete absence of hydroxyl.

EXAMPLE 12

*Reaction of Dehydroisoandrosterone*

One hundred ml. of a 24-hour broth culture of *Corynebacterium simplex* (A.T.C.C. 6946) grown in a 0.1% yeast extract (Difco) and 9.0 ml. of a 0.2 M $KH_2PO_4$ and 9.0 ml. of a 0.2 M $Na_2HPO_4$ are transferred to a 300 ml. of Erlenmeyer flask containing 150 mg. of dehydroisoandrosterone in 5.0 ml. ethanol. The flask containing the steroid and bacterial culture is placed on a shaking machine and allowed to shake for a period of 24 hours at a temperature of 28° C. to 30° C.

From an initial pH of 6.8, in 48 hours, the reaction medium has a final pH of 7.1 to 7.2.

After the transformation period, the 100 ml. broth culture is extracted with 3 equal volumes of chloroform. The chloroform volumes are combined and concentrated to dryness on a steam bath. The solid crude residue weighs 193.0 mg.

The total crude residue from the extraction of the broth is sludged with methanol, whereupon there result 30 mg. of elongated prisms, M.P. 155–165° C. The infrared spectrum of this compound is identical with that of 4-androstene-3,17-dione.

From the mother liquors of the sludge on further concentration and crystallization from ether-hexane there is obtained 70 mg. of solid M.P. 110–143° C. Recrystallization from ether gives 53 mg., M.P. 147–152° C. The infrared spectrum of this material is identical with that of 4-androstene-3,17-dione.

The products from the two crystallizations are combined and crystallized from ether. There result 70 mg. of 4-androstene-3,17-dione, M.P. 167–169° C.; there is no depression of melting point on admixture with an authentic sample.

EXAMPLE 13

*Reaction of 5-Androsten-3β,17β-Diol*

One hundred ml. of a 20-hour broth culture of *Corynebacterium simplex* (A.T.C.C. 6946) containing a 0.1% yeast extract, 9.0 ml. of 0.2 M $KH_2PO_4$ and 9.0 ml. of 0.2 M $Na_2HPO_4$ are transferred to a 300 ml. Erlenmeyer flask containing 150 mg. of androstendiol in 5.0 ml. ethanol. The flask is placed on a shaking machine and incubated at 28° C. and is allowed to run for a period of 48 hours, the final pH of this reaction mixture being 7.1.

The broth culture is extracted with three equal volumes of $CHCl_3$. The solvent volumes are combined and concentrated to dryness on a stream bath. The solid crude extract weighs 158.0 mg.

The total crude extract is crystallized from ether and there result 40 mg. of solid, M.P. 128–135° C., $[\alpha]_D^{25}$ +69° ($CHCl_3$), whose infrared spectrum contains bands characteristic of a 1,4-diene-3-one system (strong), hydroxyl (strong) and five-membered ring carbonyl (moderate). Repeated crystallization from ether-hexane and methylene chloride-hexane afford ultimately 11 mg. of 1,4-androstadiene-17β-ol-3-one, M.P. 164–166° C., $[\alpha]_D^{25}$ +25° ($CHCl_3$). The infrared spectrum of this sample is identical with that of an authentic sample.

The mother liquor from the original ether crystallization is chromatographed over Florisil which had been prepared with hexane. Material eluted from the column with 10–20% ether in hexane contains only traces of hydroxyl in the infrared spectrum and shows a strong five-membered ring carbonyl together with the 1,4-diene-3-one bands. Crystallization of the pooled eluates of this group from ether-hexane affords 25 mg. of 1,4-androstadiene-3,17-dione, M.P. 139–140°, $[\alpha]_D^{25}$ +110° ($CHCl_3$). The infrared spectrum of this material is identical with that of an authentic sample.

EXAMPLE 14

*Reaction of Testosterone*

A one hundred ml. broth culture containing a 0.1% yeast extract concentration, 9.0 ml. of 0.2 M $KH_2PO_4$ and 9.0 ml. of 0.2 M $Na_2HPO_4$ is seeded with 1 ml. of a 1.0% inoculum from a 24-hour broth culture of *Corynebacterium simplex* (A.T.C.C. 6946). The flask is incubated at 28° C. for 24 hours. A second 300 ml. Erlenmeyer flask containing 150 mg. of sterile testosterone in 5.0 ml. acetone is inoculated with the 24-hour culture of *Corynebacterium simplex* (A.T.C.C. 6946). The culture-containing steroid solution is incubated for 48 hours at 28° C. to 30° C.

After termination of the transformation period, the pH is 7.2–7.3. The culture is now directly extracted with 3 equal volumes of $CHCl_3$, the solvent volumes combined and concentrated to dryness on a steam bath. The crude extract weighs 153.0 mg.

The total crude is chromatographed on Florisil prepared with hexane. The fractions collected with 10–20% ether-hexane eluate are pooled and crystallized from ether-hexane, affording 12 mg. of a solid, M.P. 134–138° C., which is shown to be identical with 1,4-androstadiene-3.17-dione by comparison of the infrared spectra and absence of depression of melting point on admixture with an authentic sample. The fractions collected with 30–50% ether-hexane eluate are pooled and crystallized from ether-hexane, affording 32 mg. of a solid, M.P. 159–165° C., which is shown to be identical with 1,4-androstadiene-17β-ol-3-one by comparison of the infrared spectra and absence of depression of melting point on admixture with an authentic sample.

EXAMPLE 15

Reaction of Diosgenin

To a 300 ml. Erlenmeyer flask, containing 9.0 ml. each of 0.2 M $KH_2PO_4$ and 0.2 M $Na_2HPO_4$ in 1.0% yeast extract (Difco) is added in inoculum in the form of 1 ml. of a bacterial suspension of *Corynebacteriaum simplex* (A.T.C.C. 6946). The bacterial culture is placed on a shaking machine and incubated at 28° C. for 24 hours.

After 24 hours of incubation, the culture is transferred aseptically to a second flask containing 150 mg. of diosgenin (22α,25D-spirost-5-ene-3β-ol) in 5.0 ml. of ethanol. The flask is then shaken for a period of from 24–36 hours.

At the end of the transformation period, the flask is extracted with 3 equal volumes of $CHCl_3$. The $CHCl_3$ volumes are combined and concentrated to dryness on a steam bath. The crude extract weighs 175.0 mg.

The total crude extract is crystallized from methanol and there is isolated a product whose infrared spectrum shows the presence of 1,4-diene-3-one system, a 3-keto-$\Delta^4$ system and the spiroketal side-chain. The products are chromatographed over Florisil and there are isolated diosgenone and 1,4-diosgedienone-(22α-25D-spirosta - 1,4 - diene-3-one).

EXAMPLE 16

Reaction of 5-Pregnene-3β,17α,21-Triol-20-One 3,21-Diacetate

The reaction medium and organism are prepared as described in Example 14; 150 mg. of 5-pregnene-3β,17α,21-triol-20-one 3,21 diacetate are added, and the reaction is permitted to proceed as previously described.

The products are extracted with chloroform, the chloroform extracts are concentrated to a small volume and chromatographed on Florisil. The order of elution is unreacted starting material (75 mg.) first, then compound S 21-acetate (15 mg.) and finally 1,4-pregnadiene-17α,21-diol-3,20-dione (30 mg.). The products were all identified by comparison of their infrared spectra with those of authentic samples.

EXAMPLE 17

Reaction of 4-Pregnene-3β-Ol-20-One

The reaction medium and organism are prepared as described in Example 14; 150 mg. of 4-pregnene-3β-ol-20-one are added, and the reaction is permitted to proceed as previously described. The product is extracted with chloroform and isolated by evaporation to dryness. Recrystallization of the residue from etherhexane affords 73 mg. of 1,4-pregnadiene-3,20-dione, M.P. 150–152° C.

EXAMPLE 18

Reaction of 17-Ethinyltestosterone

To the reaction of medium and organism prepared as described in Example 14, there are added 150 mg. of 17-ethinyltestosterone and the reaction is permitted to proceed as previously described.

The product is extracted with chloroform and isolated by evaporation to dryness. Recrystallization of the residue yields 17-ethinyl-1,4-androstadiene-17β-ol-3-one as a crystalline solid.

EXAMPLE 19

Reaction of 17-Methyltestosterone

The reaction of medium and organism are prepared as described in Example 14; 150 mg. of 17-methyltestosterone are added and the reaction is permitted to proceed as above described.

The product is extracted with chloroform and isolated by evaporation to dryness. Recrystallization of the residue gives crystalline 17α-methyl-1,4-androstadiene-17β-ol-3-one.

EXAMPLE 20

Reaction of Corticosterone

The reaction medium and organism are prepared as described in Example 14; 150 mg. of 4-pregnene-11β,21-diol-3,20-dione are added and the reaction is permitted to proceed as above described.

The product is extracted with chloroform and isolated by evaporation to dryness. Recrystallization of the residue affords crystalline 1,4-pregnadiene-11β,21-diol-3,20-dione.

EXAMPLE 21

Reaction of Desoxycorticosterone

The reaction medium and organism are prepared as described in Example 14; 150 mg. of 4-pregnene-21-ol-3,20-dione are added and the reaction is permitted to proceed as above described.

The product is extracted with chloroform and isolated by evaporation to dryness. Recrystallization of the residue affords 1,4-pregnadiene-21-ol-3,20-dione as a crystalline solid.

EXAMPLE 22

Reaction of 11-Dehydrocorticosterone

To the reaction medium and organism prepared as described in Example 14, 150 mg. of 4-pregnene-21-ol-3,11,20-trione are added and the reaction is permitted to proceed as above described.

The product is extracted with chloroform and isolated by evaporation to dryness. Recrystallization of the residue yields crystalline 1,4-pregnadiene-21-ol-3,11,20-trione.

As will be evident from the foregoing, the carbon side chain remains undisturbed in my process, i.e., it is not split off in whole or in part, whether it contains but a single carbon atom, as in 17-methyl-testosterone, or contains two carbon atoms, saturated or unsaturated, as in pregnane compounds and in ethinyl testosterone, or contains more complex side chains, as in the sapogenins and pseudo-sapogenins, and as my experiments have indicated, in other steroids, like the bile and cholanic acids and their nor- and bisnor-derivatives.

With reference to the acetylation of the dienes described in Examples 1 and 2, it will be evident that other esters of the diene derivatives can be similarly prepared by reaction with the anhydride of the acid or with its chloride in known manner or by utilizing any of the known methods for preparing esters. These esters, especially the 21-esters, as a class are within the presence of my invention and I have heretofore called such esters "pharmaceutically acceptable esters" by which term I mean those esters commonly used in steroid hormone therapy. Representative of such esters those formed from hydrocarbon carboxylic acids and dicarboxylic acids having up to 10 carbon atoms. While the acetates are most commonly used, other lower alkanoyl esters of the various hydroxylated dienes may be produced, such as the formates, propionates, butyrates, and valerates, cyclopentyl propionates, and likewise the esters of other nontoxic acids, like the benzoates, and also the neutral and acid esters of polybasic acids, like succinic, maleic, malic, citric, tartaric, phthalic and hexahydrophthalic. In the case of the acid esters, the metal salts can be formed in the usual manner by reaction with the hydroxide, carbonate or bicarbonate of the metal, as of the alkali and alkaline earth metals. Esters of polybasic inorganic acids such as sulfates, phosphates, and the like are also preparable from the free 20-ol or as indicated heretofore such grouping may be present during the fermentation.

Instead of forming the 1,4-dienes of cortical hormones such as cortisone and hydrocortisone, and subsequently esterifying the products, the corresponding esters of the monoenes and of their intermediates can be subjected to the process of the present invention and will yield the dienes of the esters. However, as above indicated, by suitable control of the reaction conditions the 21-alcohols can also be obtained from the 21-esters. Thus, in Example 1, cortisone can be replaced by its 21-ester, as in Example 4, or by its 17α,21-diester (such as the acetate ester), or by 5-pregnen-3,17α,21-triol-11,20-dione 21-acetate or 17α,21-diacetate, or 3,17α,21-triacetate or other esters; while in Example 2, hydrocortisone can be replaced by its 21-acetate, or 17α,21-diacetate, or 11β,17α-21-triacetate; or by 5-pregnen-3,11β,17α,21-tetrol-20-one 3,21-diacetate, 3,17α,21-triacetate or 3,11β,17α,21-tetraacetate. The polyesters can in all cases be mixed esters, like 3-propionate 21-acetate.

As already stated, where a 3-hydroxy intermediate is employed, the formation of the diene derivative will be accompanied by an oxidation of the hydroxyl group to a keto group with a shifting of the double bond to the 4,5-position; while in the case of a 3-ester, such oxidation step will be preceded by a hydrolysis of the 3-ester group.

In place of cortisone, there can be employed as starting material 5-pregnen-3,17α,21-triol-11,20-dione, 5-pregnen-3,17α,20,21-tetrol-11-one or their 3-acetates or other esters which are non-toxic toward the microorganism or inhibiting toward its enzyme; while similarly, in place of hydrocortisone, there can be used 5-pregnen-3,11β,17α, 21-tetrol-20-one, 5-pregnen-3,11β,17α,20,21-pentol, or their 3-acetates or other esters. As indicated above, the 20-hydroxy group will in each case be oxidized to a keto group.

The following are examples of pharmaceutical compositions prepared in accordance with the invention and containing as the active hormone substance a 1,4-pregnadiene compound (preferably an anti-inflammatory compound) of my invention:

EXAMPLE A

| | Mg./tab. |
|---|---|
| 1-dehydrocortisone | 5.00 |
| Lactose | 83.85 |
| Starch | 9.50 |
| Gelatin | 1.19 |
| Magnesium stearate | 0.46 |

This mixture provides a tablet for oral use in the treatment of rheumatoid arthritis and kindred conditions. The quantity of 1-dhydrocortisone may be increased to about 30 mg. per tablet, but for tri-daily administration, 5 to 10 mg. for each administration is usually sufficient as maintenance doses.

EXAMPLE B

| | Mg./tab. |
|---|---|
| 1-dehydrocortisone | 5.0 |
| Acetophenetidin | 162.0 |
| Caffeine, anhydrous | 32.0 |
| Acetylalicylic acid | 227.67 |
| Gelatin | 5.0 |
| Corn starch | 55.33 |
| Stearic acid | 3.0 |

EXAMPLE C

| | Mg./ml. |
|---|---|
| 1-dehydrocortisone, microcrystalline, sterile | 5.0 |
| Potassium dihydrogen phosphate, C.P. ($KH_2PO_4$) | 6.0 |
| Disodium hydrogen phosphate, C.P. anh. ($Na_2HPO_4$) | 12.0 |
| Polysorbate 80, U.S.P. (Tween 80—Atlas) | 0.4 |
| Sorbitan monolaurate (Span 20—Atlas) | 0.4 |
| Thimerosal, N.F. (Merthiolate—Lilly) | 0.1 |
| Water for injection, U.S.P., to make 1.00 ml. | |

This aqueous suspension is suitable for subcutaneous and intramuscular injection, and also as an ophthalmic preparation.

EXAMPLE D 1-dehydrocortisone, microcrystals, 0.5% in a vehicle containing:

| | Percent |
|---|---|
| Sodium chloride | 0.9 |
| Sodium carboxymethylcellulose | 0.4 |
| Polyoxyethylenesorbitan mono-oleate | 0.4 |
| Benzyl alcohol | 0.9 |
| Water for injection, q.s. 100%. | |

This mixture provides a suspension for intra-articular injection at the site of inflammation.

EXAMPLE E

| | | |
|---|---|---|
| 1-dehydrocortisone | mg | 5.0 |
| Dimethylacetamine, q.s. | ml | 1.0 |

This infusion is to be diluted with 500 ml. 50% dextrose injection U.S.P. before administration by intravenous injection.

EXAMPLE F

| | Mg./ml. |
|---|---|
| 1-dehydrocortisone, microcrystalline | 5.0 |
| Chloroprophenpyridamine gluconate, Schering | 3.0 |
| D-sorbitol | 43.0 |
| Benzalkonium chloride, U.S.P. | 0.25 |
| Distilled water, to make 1.0 ml. | |

The above mixture can be applied as a nasal spray.

EXAMPLE G

| | Mg./ml. |
|---|---|
| 1-dehydrocortisone, microcrystalline | 5.0 |
| Aluminum monostearate | 20.0 |
| Propylparaben, U.S.P. | 1.0 |
| Sesame oil, U.S.P., to make 1.0 ml. | |

This oil suspension can be injected intramuscularly or subcutaneously.

EXAMPLE H

| | Mg./g. |
|---|---|
| 1-dehydrocortisone, microcrystalline | 5.0 |
| Methylparaben, U.S.P. | 1.7 |
| Propylparaben, U.S.P. | 0.3 |
| Liquid petrolatum, U.S.P. | 120.0 |
| Anhydrous lanolin (wool fat), U.S.P. | 200.0 |
| White petrolatum, U.S.P. | 673.0 |

This mixture forms as ointment suitable for ophthalmic uses.

EXAMPLE I

| | Mg./g. |
|---|---|
| 1-Dehydrocortisone, microcrystalline | 5.0 |
| Tetracycline hydrochloride | 5.0 |
| Methylparaben, U.S.P. | 1.7 |
| Propylparaben, U.S.P. | 0.3 |
| Liquid petrolatum, U.S.P. | 120.0 |
| Anhydrous lanolin (wool fat), U.S.P. | 200.0 |
| White petrolatum, U.S.P. | 668.0 |

The above provides an antibacterial hormonal ointment suitable for ophthalmic treatment.

EXAMPLE J

| | Mg./g. |
|---|---|
| 1-dehydrocortisone, microcrystalline, sterile | 5.0 |
| Sodium sulfacetamide, anhydrous (Schering) | 100.0 |
| Methylparaben (U.S.P. XIV) | 0.50 |
| Propylparaben (U.S.P. XIV) | 0.10 |
| Arlacel 20 (Atlas) | 1.00 |
| Mineral oil (U.S.P. XIV), Kaydol | 250.0 |
| White petrolatum (U.S.P. XIV), Protopet IS, to make 1000.0 mg. | |

This ointment composition can be used for ophthalmic purposes.

EXAMPLE K

| | Mg./ml. |
|---|---|
| 1-dehydrocortisone, microcrystalline | 5.0 |
| Chloroprophenpyridamine maleate, Schering | 2.50 |
| Sodium dihydrogen phosphate, monohydrate, reagent | 4.603 |
| Disodium hydrogen phosphate, anhydrous, reagent | 4.73 |
| Sodium chloride, reagent | 4.30 |
| Benzalkonium chloride, U.S.P. | 0.25 |
| Distilled water, U.S.P., to make 1.00 ml. | |

This composition provides an ophthalmic suspension.

EXAMPLE L

| | Mg./ml. |
|---|---|
| 1-dehydrocortisone, microcrystalline | 5.0. |
| Sodium sulfacetamide (monohydrate) | 100.0. |
| Sodium dihydrogen phosphate, A.R., monohydrate | 1.25 (1.087 anhydrous). |
| Disodium hydrogen phosphate, A.R., anhydrous | 0.50. |
| Sodium thiosulfate, U.S.P., reagent pentahydrate | 1.57 (1.00 anhydrous). |
| Methylparaben, U.S.P. | 0.50. |
| Propylparaben, U.S.P. | 0.10. |
| Distilled water (sterile), to make 1.00 ml. | |

This composition provides an ophthalmic suspension containing a sulfa drug as an antibacterial agent.

EXAMPLE M

| | Mg./ml. |
|---|---|
| 1-dehydrocortisone, microcrystalline, sterile | 5.0. |
| Sodium sulfacetamide (monohydrate) | 100.00. |
| Neomycin sulfate | 5.0. |
| Sodium dihydrogen phosphate, A.R., monohydrate | 1.25 (1.087 anhydrous). |
| Disodium hydrogen phosphate, A.R., anhydrous | 0.50. |
| Sodium thiosulfate, U.S.P., reagent pentahydrate | 1.57 (1.00 anhydrous). |
| Methylparaben, U.S.P. | 0.50. |
| Proplyparaben, U.S.P. | 0.10. |
| Distilled water (sterile), to make 1.00 ml. | |

This mixture is also an ophthalmic suspension with antibacterial properties.

EXAMPLE N

| | Mg./ml. |
|---|---|
| 1-dehydrocortisone, microcrystalline, sterile | 5.0 |
| Sodium chloride, C.P. | 4.300 |
| Disodium phosphate, C.P., anhydrous ($Na_2HPO_4$) | 4.730 |
| Monosodium phosphate, C.P., monohydrate ($NaH_2PO_4H_2O$) | 4.603 |
| Benzalkonium chloride, U.S.P. | 0.200 |
| Distilled water, U.S.P., to make 1.000 ml. | |

This composition is useful as an ophthalmic suspension.

EXAMPLE O

| | Mg./g. |
|---|---|
| 1-dehydrocortisone | 5.0 |
| Zinc stearate, U.S.P. | 60.9 |
| Polyethylene glycol 6000 (Carbowax 6000) | 122.0 |
| Polyethylene glycol 1500 (Carbowax 1500) | 421.3 |
| Propylene glycol, U.S.P. | 345.2 |
| Distilled water | 45.6 |

This mixture forms a creamy composition for topical use.

EXAMPLE P

| | Mg./g. |
|---|---|
| 1-dehydrocortisone | 5.0 |
| Neomycin sulfate | 5.0 |
| Zinc stearate, U.S.P. | 60.0 |
| Polyethylene glycol 6000 (Carbowax 6000) | 122.0 |
| Polyethylene glycol 1500 (Carbowax 1500) | 421.3 |
| Propylene glycol, U.S.P. | 345.2 |
| Distilled water | 40.6 |

This is likewise a cream for topical use, but is also antibacterial in character.

EXAMPLE Q

| | Mg./g. |
|---|---|
| 1-dehydrocortisone | 5.0 |
| Tetracycline hydrochloride | 30.0 |
| Neomycin sulfate | 5.0 |
| Zinc stearate, U.S.P. | 60.9 |
| Polyethylene glycol 6000 (Carbowax 6000) | 122.0 |
| Polyethylene glycol 1500 (Carbowax 1500) | 421.3 |
| Propylene glycol, U.S.P. | 345.2 |
| Distilled water | 40.6 |

The above mixture yields a cream suitable for topical application.

In the above formulations, 1-dehydrocortisol (1-dehydrohydrocortisone) may replace the 1-dehydrocortisone or mixtures of these two compounds may be employed in any proportions. The corresponding 9α-fluoro or chloro-compounds may be used in similar pharmaceutical preparations, and they may be mixed in any suitable proportion with 1-dehydrocortisone or 1-dehydrocortisol. The Δ¹-compounds may also be employed in admixture with cortisone or hydrocortisone in different proportions. Thus, in the tablets, emulsions, suspensions, infusions and creams hereinabove described, up to about 75% of the 1-dehydrocortisone can be replaced by an approximately equal weight of 1-dehydrocortisol and a minor proportion of Δ¹-derivatives (say, up to about 40%), can be replaced by cortisone or hydrocortisone, or a mixture of the two known compounds.

It will be understood that in the various pharmaceutical compositions prepared in accordance with the invention, the concentration of the 1-dehydrocortisone or 1-dehydrocortisol or of their 9α-halogeno derivatives will be such that an amount of the composition which can be conveniently administered during each treatment will contain sufficient quantity of such 1,4-pregnadiene which will elicit a proper therapeutic response. In the case of 1-dehydrocortisone and 1-dehydrocortisol this will be a dosage unit containing about 5 to 30 g. However, such an amount may be less for more potent ingredients. Thus, in the case of an infusion, the amount of solution which can be conveniently and safely injected during each administration will contain 5 to 30 mg. of the 1-dehydrocortisone or 1-dehydrocortisol. Similarly, in the case of a tablet, the concentration of the Δ¹-compound or compounds will be such that a tablet (by which term is included pills, capsules and other unit dosage forms) of a size which can be conveniently swallowed, will contain a therapeutically effective dose.

I claim:
1. The Δ⁴-pregnene having a keto group at the 3- and 20-positions, hydrogen at the 9α-position, hydroxy at the 17α-position, and a member of the group consisting of hydroxy and pharmaceutically acceptable esters thereof at the 21-position, and being characterized by the presence of a double bond in the 1-position and a member of the group consisting of keto and β-hydroxy at the 11-position.

2. 1,4-pregnadiene-17α,21-diol-3,11,20-trione having a melting point of about 230–232° C. with decomposition and a specific rotation of about +175° in dioxane.

3. A 21-pharmaceutically acceptable ester of 1,4-pregnadiene-17α,21-diol-3,11,20-trione.

4. 1,4 - pregnadiene - 17α,21-diol-3,11,20-trione 21-acetate.

5. 1,4-pregnadiene-11β,17α,21-triol-3,20-dione having a melting point of about 239–241° C. with decomposition and a specific rotation of about +107° in dioxane.

6. A pharmaceutically acceptable ester of 1,4-pregnadiene-11β,17α,21-triol-3,20-dione.

7. 1,4 - pregnadiene-11β,17α,21-triol-3,20-dione 21-acetate.

8. A pharmaceutical preparation comprising an effective amount of an anti-inflammatory composition of matter in the form of a Δ⁴-pregnene having a keto group at the 3- and 20-positions, hydrogen at the 9α-position, hydroxy at the 17α-position and a member of the group consisting of hydroxy and pharmaceutically acceptable esters thereof at the 21-position, and being characterized by the presence of a double bond in the 1-position and a member of the group consisting of keto and β-hydroxy at the 11-position, mixed with a non-toxic pharmaceutical carrier.

9. The process for the application of anti-inflammatory therapy which comprises administering an effective amount of a pharmaceutical formulation comprising a composition of matter in the form of a Δ⁴-pregnene having a keto group at the 3- and 20-positions, hydrogen at the 9α-position, hydroxy at the 17α-position and a member of the group consisting of hydroxy and pharmaceutically acceptable esters thereof at the 21-position, and being characterized by the presence of a double bond in the 1-position and a member of the group consisting of keto and β-hydroxy at the 11-position, mixed with a non-toxic pharmaceutical carrier.

10. The process for the application of anti-inflammatory therapy which comprises administering an effective amount of a pharmaceutical formulation comprising a composition of matter selected from the group consisting of 1,4-pregnadiene-17α,21-diol-3,11,20-trione and the 21-pharmaceutically acceptable esters thereof.

11. The process for the application of anti-inflammatory therapy which comprises administering an effective amount of a pharmaceutical formulation comprising a composition of matter selected from the group consisting of 1,4-pregnadiene-11β,17α-21-triol-3,20-dione and the 21-pharmaceutically acceptable esters thereof.

12. The Δ⁴-pregnene having a keto group at the 3- and 20-positions, hydrogen at each of the 9α- and 17α-positions and a member of the group consisting of hydrogen, hydroxy and pharmaceutically acceptable esters thereof at the 21-position, and being characterized by the presence of a double bond in the 1-position and a member of the group consisting of (H, H), O and (H, OH) at the 11-position.

13. 1,4-pregnadiene-3,20-dione.
14. 1,4-pregnadiene-11β,21-diol-3,20-dione.
15. 1,4-pregnadiene-21-ol-3,11,20-trione.
16. 1,4-pregnadiene-21-ol-3,20-dione.
17. 1,4-pregnadiene-11β,21-diol-3,20-dione 21 - lower alkanoate.
18. 1,4-pregnadiene-21-ol-3,11,20-trione 21-lower alkanoate.
19. 1,4-pregnadiene-21-ol-3,20-dione 21 - lower alkanoate.
20. 17α-ethinyl-1,4-androstadiene-17β-ol-3-one.
21. 22α-25D-spirosta-1,4-diene-3-one.
22. 1,4-pregnadiene-17α,20,21-triol-3-one.
23. A 21-lower alkanoate of 1,4-pregnadiene-17α,20,21-triol-3-one.
24. A Δ¹,⁴-pregnadiene-11β,17α,21-triol-3,20 - dione of the formula

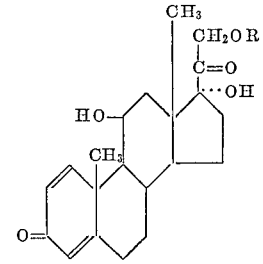

wherein R is a member selected from the group consisting of hydrogen and lower alkanoyl.

25. A Δ¹,⁴-pregnadiene-17α,21-diol-3,11,20-trione of the formula

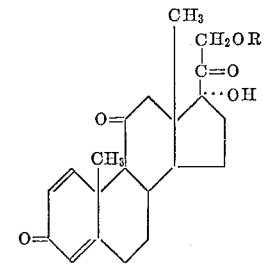

wherein R is a member selected from the group consisting of hydrogen and lower alkanoyl.

References Cited in the file of this patent
UNITED STATES PATENTS
2,774,775    Korman et al. _____ Dec. 18, 1956

UNITED STATES PATENT OFFICE
CERTIFICATE OF CORRECTION

Patent No. 3,134,718

May 26, 1964

Arthur Nobile

It is hereby certified that error appears in the above numbered patent requiring correction and that the said Letters Patent should read as corrected below.

Column 2, line 21, for "-pregnane" read -- -pregnene --; line 43, for "modifications" read -- modification --; column 3, line 39, for "11β,17α,2" read -- 11β,17α,21 --; same column 3, lines 62, 63, 64 and 65 should appear as shown below instead of as in the patent:

Y=-CO·CH$_2$OR (R=H or acyl) when
Z=...OH or...H
Y=-OH when
Z=...C≡CH or...CH$_3$ or...H lines 66 to 75, the right-hand formula should appear as shown below instead of as in the patent:

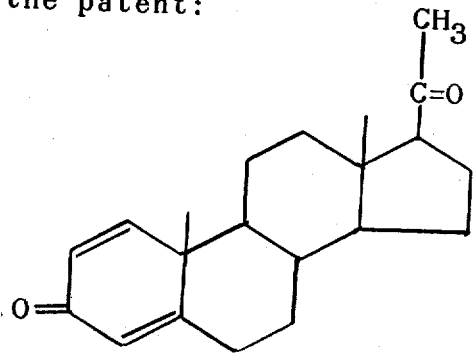

column 4, line 55, for "transformation" read -- transformations --; column 6, lines 1 to 10, the right-hand portion of formula (5) should appear as shown below instead of as in the patent:

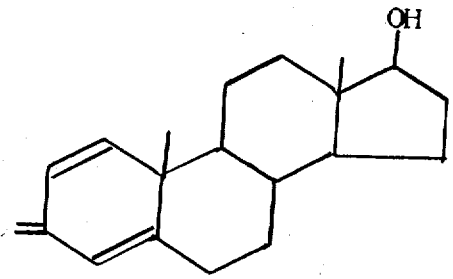

3,134,718
same column 6, lines 26 to 35, formula (7) should appear as shown below instead of as in the patent:
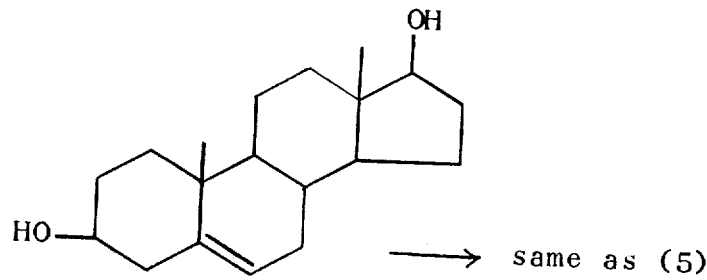
→ same as (5)
same column 6, lines 51 to 75, formula (9) should appear as shown below instead of as in the patent:
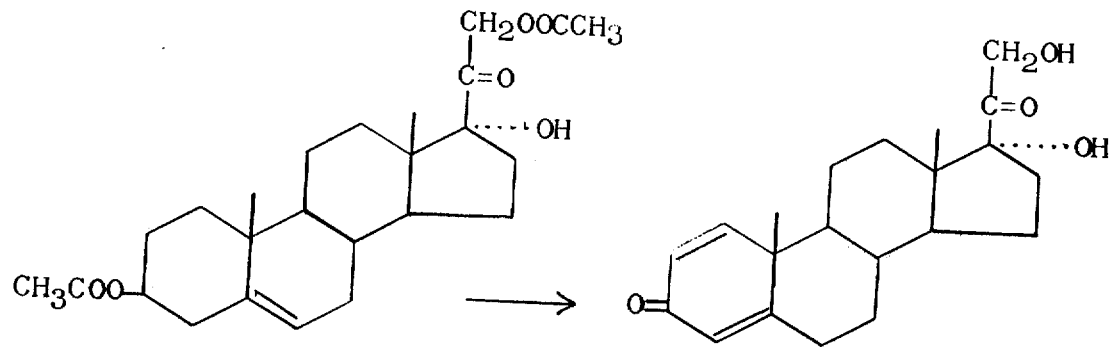
+
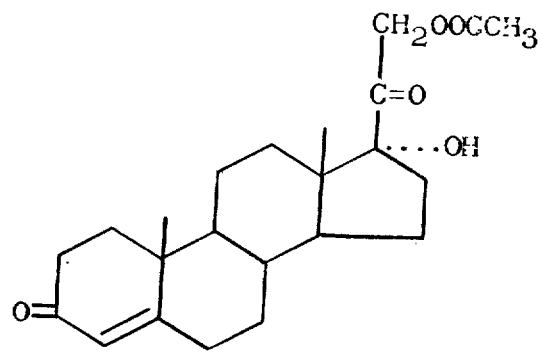

3,134,718 column 7, TABLE I, under the heading "Products", lines 37 and 38 thereof, for "1,4-Pregnaiene-3,20-dione." read -- 1,4-Pregnadiene-3,20-dione. --; same column 7, line 39, for "hermone" read -- hormone --; column 8, lines 15 and 16, for "l-dehydrocortisone" read -- l-Dehydrocortisone --; column 9, line 50, for "diones" read -- dienes --; column 10, line 50, for "adminsitered" read -- administered --; line 64, for "ot" read -- to --; column 13, line 69, for "steriod" read -- steroid --; column 15, line 43, for "asptically" read -- aseptically --; line 65, after "ml." strike out "of"; column 16, line 32, for "stream" read -- steam --; column 17, line 18, for "in", first occurrence, read -- an --; column 18, line 4, after "reaction" strike out "of"; column 19, line 6, for "20-ol" read -- 21-ol --; line 62, for "l-dhydrocortisone" read -- l-dehydrocortisone --; column 20, line 30, for "Dimethylacetamine" read -- Dimethylacetamide --.

Signed and sealed this 22nd day of December 1964.

(SEAL)
Attest:

ERNEST W. SWIDER
Attesting Officer

EDWARD J. BRENNER
Commissioner of Patents